United States Patent [19]
Petty et al.

[11] Patent Number: 6,157,689
[45] Date of Patent: Dec. 5, 2000

[54] AUTOMATIC SPEED DETECTION FOR ASYNCHRONOUS SERIAL COMMUNICATIONS

[75] Inventors: Jack S. Petty, Chapel Hill; Kevin Macauley; William Sorce, both of Raleigh, all of N.C.; David Quinn, East Kilbridge, United Kingdom

[73] Assignee: Ericsson Inc., Research Triangle Park, N.C.

[21] Appl. No.: 09/039,876

[22] Filed: Mar. 16, 1998

[51] Int. Cl.[7] .................................................. H04L 25/38
[52] U.S. Cl. ........................... 375/370; 375/222; 375/369
[58] Field of Search ..................................... 375/370, 222

[56] References Cited

U.S. PATENT DOCUMENTS

| | | | |
|---|---|---|---|
| 3,689,846 | 9/1972 | Naeyaert .................................. | 375/370 |
| 4,586,189 | 4/1986 | Tyrrell ..................................... | 375/370 |
| 4,914,688 | 4/1990 | Kobayashi et al. .................... | 379/93.29 |
| 5,008,902 | 4/1991 | Key et al. ............................... | 375/225 |
| 5,072,407 | 12/1991 | Gutz et al. .............................. | 709/246 |
| 5,140,679 | 8/1992 | Michael .................................. | 710/106 |
| 5,206,888 | 4/1993 | Hiraguchi et al. ..................... | 377/20 |
| 5,222,081 | 6/1993 | Lewis et al. ............................ | 375/117 |
| 5,274,679 | 12/1993 | Abe et al. ............................... | 375/370 |
| 5,490,209 | 2/1996 | Kennedy ................................. | 379/93.08 |
| 5,627,858 | 5/1997 | Mak et al. .............................. | 375/225 |
| 5,649,122 | 7/1997 | Wegner et al. ......................... | 710/105 |
| 5,654,983 | 8/1997 | Sauser, Jr. .............................. | 375/225 |

FOREIGN PATENT DOCUMENTS 0 364 720 A1   4/1990   European Pat. Off. .

OTHER PUBLICATIONS

Wegener, A.W., "Practical Techniques for Baud Rate Estimation," Digital Signal Processing 1, San Francisco Mar. 23–26, 1992, vol. 4, No. Conf. 17, Mar. 23, 1992, pp. IV-681–IV-684, XP000467286, Institute of Electrical and Electronic Engineers.

Annex to Form PCT/ISA/206 (Communication Relating to the Results of the Partial International Search), PCT/US99/02706, Jun. 21, 1999.

*Primary Examiner*—Stephen Chin
*Assistant Examiner*—Paul N Rupert
*Attorney, Agent, or Firm*—Myers Bigel Sibley & Sajovec

[57] ABSTRACT

The speed of asynchronous serial communications is detected by determining a duration of a data bit within an asynchronous data stream. The duration of the data bit is used to generate a clock frequency. The clock frequency is used to clock data from the asynchronous data stream into a register. The clocked data is processed according to an error indication.

18 Claims, 13 Drawing Sheets

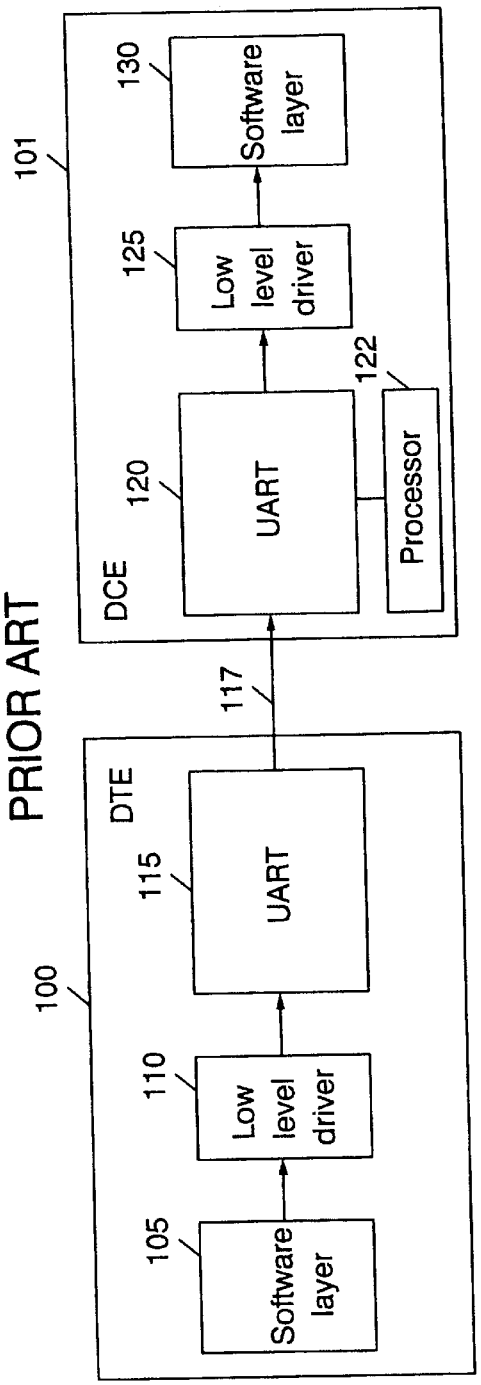

FIG. 5B

| First Character (A or a) | | Second Character (T, t, or /) | | Format, Comments | |
|---|---|---|---|---|---|
| b8 | b9 | b8 | b9 | | |
| 0 | 0 | 0 | 0 | | 8S1 |
| 0 | 0 | 0 | 1 | | 8E1 |
| 0 | 0 | 1 | 0 | invalid combination, use | 8S1 |
| 0 | 0 | 1 | 1 | invalid combination, use | 7E1 |
| 0 | 1 | 0 | 0 | | 8O1 |
| 0 | 1 | 0 | 1 | ambiguous, use | 8N1 |
| 0 | 1 | 1 | 0 | invalid combination, use | 7E1 |
| 0 | 1 | 1 | 1 | invalid combination, use | 7E1 |
| 1 | 0 | 0 | 0 | invalid combination, use | 8S1 |
| 1 | 0 | 0 | 1 | invalid combination, use | 7O1 |
| 1 | 0 | 1 | 0 | invalid combination, use | 7N1 |
| 1 | 0 | 1 | 1 | invalid combination, use | 7N2 |
| 1 | 1 | 0 | 0 | invalid combination, use | 7O1 |
| 1 | 1 | 0 | 1 | | 7O1 |
| 1 | 1 | 1 | 0 | invalid combination, use | 7N1 |
| 1 | 1 | 1 | 1 | ambiguous, use | 7N2 |

| First Character (A or a) | | Second Character (T, t, or /) | | Format, Comments | |
|---|---|---|---|---|---|
| b8 | b9 | b8 | b9 | | |
| 0 | 0 | 0 | 0 | | 8S1 |
| 0 | 0 | 0 | 1 | | 8O1 |
| 0 | 0 | 1 | 0 | invalid combination, use | 8O1 |
| 0 | 0 | 1 | 1 | invalid combination, use | 8S1 |
| 0 | 1 | 0 | 0 | | 8E1 |
| 0 | 1 | 0 | 1 | ambiguous, use | 8N1 |
| 0 | 1 | 1 | 0 | invalid combination, use | 7O1 |
| 0 | 1 | 1 | 1 | invalid combination, use | 7O1 |
| 1 | 0 | 0 | 0 | invalid combination, use | 7N1 |
| 1 | 0 | 0 | 1 | invalid combination, use | 7E1 |
| 1 | 0 | 1 | 0 | invalid combination, use | 7N1 |
| 1 | 0 | 1 | 1 | invalid combination, use | 7N2 |
| 1 | 1 | 0 | 0 | invalid combination, use | 7E1 |
| 1 | 1 | 0 | 1 | | 7E1 |
| 1 | 1 | 1 | 0 | invalid combination, use | 7N1 |
| 1 | 1 | 1 | 1 | ambiguous, use | 7N2 |

FIG. 5D

| First Character (A or a) | | Second Character (T, t, or /) | | Format, Comments |
|---|---|---|---|---|
| b8 | b9 | b8 | b9 | |
| 0 | 0 | 0 | 0 | 8S1 |
| 0 | 0 | 0 | 1 | 8E1 |
| 0 | 0 | 1 | 0 | use prior value |
| 0 | 0 | 1 | 1 | use prior value |
| 0 | 1 | 0 | 0 | 8O1 |
| 0 | 1 | 0 | 1 | 8N1 |
| 0 | 1 | 1 | 0 | use prior value |
| 0 | 1 | 1 | 1 | 7E1 |
| 1 | 0 | 0 | 0 | use prior value |
| 1 | 0 | 0 | 1 | use prior value |
| 1 | 0 | 1 | 0 | 7N1 |
| 1 | 1 | 0 | 1 | use prior value |
| 1 | 1 | 0 | 0 | use prior value |
| 1 | 1 | 1 | 1 | 7O1 |
| 1 | 1 | 1 | 0 | use prior value |
| 1 | 1 | 1 | 1 | 7N2 |

FIG. 5E

| First Character (A or a) | | Second Character (T, t, or /) | | Format, Comments |
|---|---|---|---|---|
| b8 | b9 | b8 | b9 | |
| 0 | 0 | 0 | 0 | use prior value which should be one of 8S1 or 8O1 |
| 0 | 0 | 0 | 1 | use prior value |
| 0 | 0 | 1 | 0 | use prior value |
| 0 | 0 | 1 | 1 | use prior value |
| 0 | 1 | 0 | 0 | use prior value |
| 0 | 1 | 0 | 1 | use prior value which should be one of 8N1, 7O1, or 8E1 |
| 0 | 1 | 1 | 0 | use prior value |
| 0 | 1 | 1 | 1 | use prior value |
| 1 | 0 | 0 | 0 | use prior value |
| 1 | 0 | 0 | 1 | use prior value |
| 1 | 0 | 1 | 0 | use prior value or 7N1 as the backup possibility |
| 1 | 1 | 1 | 1 | use prior value |
| 1 | 1 | 0 | 0 | use prior value |
| 1 | 1 | 0 | 1 | use prior value |
| 1 | 1 | 1 | 0 | use prior value or 7N1 as the backup possibility |
| 1 | 1 | 1 | 1 | use prior value which should be one of 7N2 or 7M1 | a/

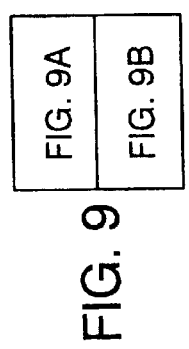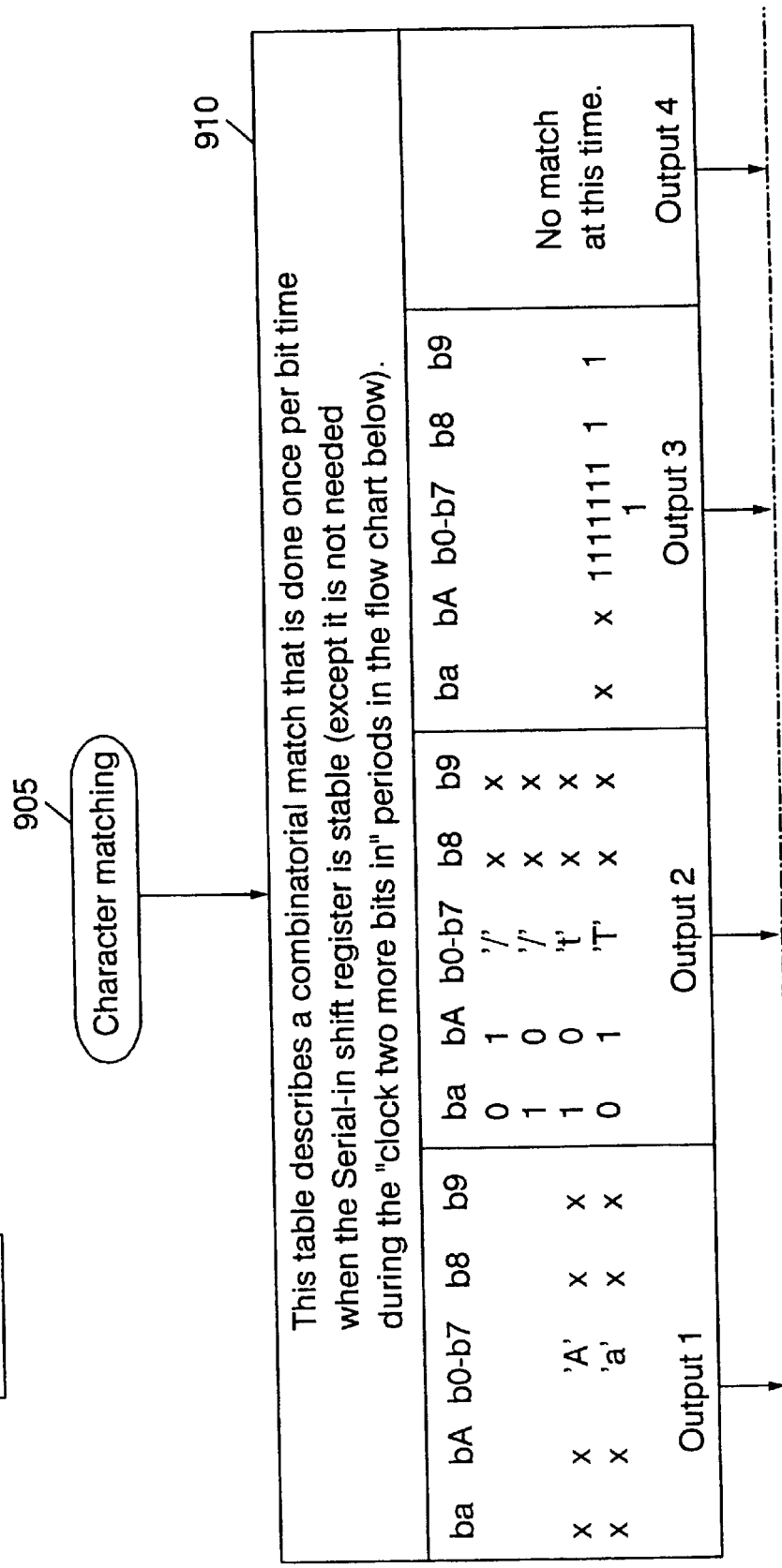
FIG. 9A

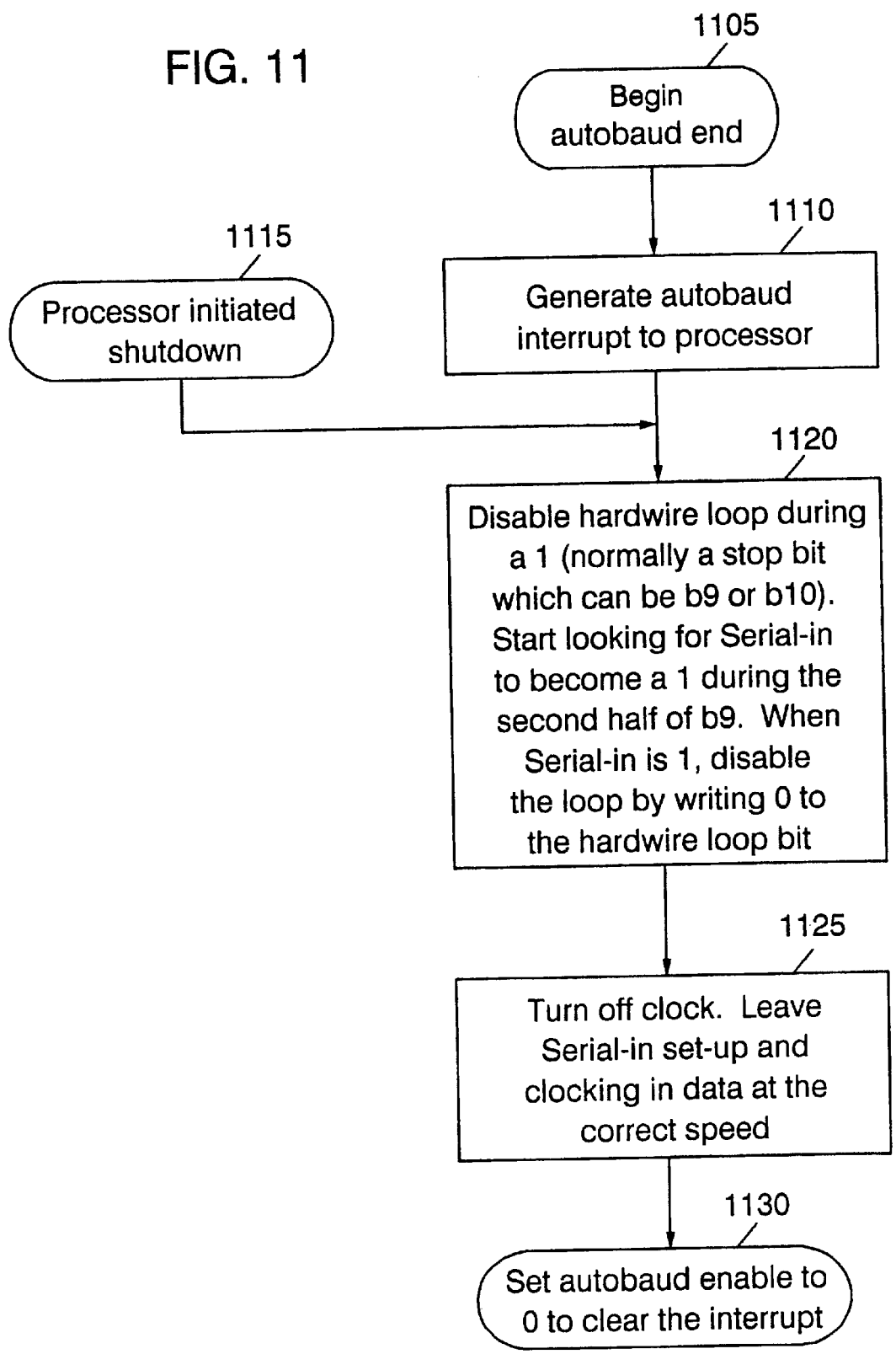

AUTOMATIC SPEED DETECTION FOR ASYNCHRONOUS SERIAL COMMUNICATIONS

FIELD OF THE INVENTION

The present invention relates to data communications, and particularly to asynchronous serial communications.

BACKGROUND OF THE INVENTION

Asynchronous serial data communications systems are known wherein a Data Terminal Equipment (DTE) asynchronously transmits/receives serial data to/from a Data Communications Equipment (DCE) at varying baud rates. The baud rate represents the rate (i.e., bits per second or bps) at which data is communicated between the DTE and the DCE. For example, the DTE may transmit/receive data to/from the DCE at a rate in a range between about 300 bps to 15,200 bps. Before any communication begin, however, the DTE and DCE are required to operate at the same baud rate. The autobaud command may be used to equalize the baud rate used by the DTE and the DCE.

FIG. 1 illustrates a system utilizing asynchronous serial data communications according to the prior art. DTE 100 is a data terminal equipment, such as an ASCII terminal or a personal computer. DCE 101 may be a data communications equipment, such as a modem. Communications link 117 may be an asynchronous serial data communication link between DTE 100 and DCE 101.

DTE 100 may include a first upper software layer 105, a first low level driver 110 and a first UART 115. The first upper software layer 105 may carry out high level functions required of DTE 100. For example, first upper software layer 105 may be a software application. First low level driver 110 may be a low level software module used to carry out system functions required by the first upper software layer 105. The first low level driver 110 may have detailed information regarding the operation of the hardware included in DTE 100, such as the first UART 115. The first UART 115 is a Universal Asynchronous Receiver Transmitter which may carry out asynchronous serial data communications over the communications link 117.

The DCE 101 may include a second UART 120, a second low level driver 125 and a second upper software layer 130, all of which may operate in a similar fashion to the analogous components included in DTE 100, and a processor 122. The processor 122 may provide internal services to the DCE 101 including synchronization and management of the other components included in DCE 101.

The communications link 117 may be an asynchronous serial data communications link defined as ITU V.24, V.28 or other serial communications format. The format of characters communicated over the communication link 117 may be in compliance with ITU T.50, V.4 or other character format.

First UART 115 and second UART 120 may operate at different speeds. For example first UART 115 may initially operate at 28.8K bps, while second UART 120 may initially operate at 33.3K bps. In this initial state, first UART 115 and second UART 120 may not be able to communicate. For this reason, the autobaud command may be used to equalize the speed of first UART 115 and 120. The autobaud command may include any command or string of characters sent from the DTE 100 which allows the DCE 101 to detect the speed and character format of the characters transmitted by DTE 100. The DTE 100 may perform an autobaud command by transmitting a pair of known characters to the DCE 101. When the second UART 120 is initialized to the same baud rate used by the first UART 115, first UART 115 and second UART 120 may communicate across the communications link 117. For example, the autobaud command may be implemented using the ASCII characters AT, at, a/, or A/ wherein each ASCII character is made up of a series of data bits.

FIG. 2A illustrates the data bit values which may make-up the characters used in the autobaud. For example, the ASCII character A may be comprised of the bit values b1=1, b2=0, b3=0, b4=0, b5=0, b6=0, and b7=1. When this series of data bits is detected, the DCE 101 indicates that an ASCII character A was received. The ASCII character T may be made up of the bit values b1=0, b2=0, b3=1, b4=0, b5=1, b6=0, and b7=1. Accordingly, when the DCE 101 receives the ASCII characters A and T in succession, the second UART 120 sets the baud rate to the rate measured during the reception of the A and the T characters. The second UART 120 may determine the baud rate used to transmit the characters in the autobaud command by measuring the time needed to transmit a bit in the A and T characters. Bit 8 (b8) and bit 9 (b9) may be a parity bit or one or two stop bits, depending on the character format used. Thereby, the values of b8 and b9 are unknown and represented by question marks.

FIG. 2B illustrates the logic levels of various signals within an asynchronous serial data communications format used by comnmunications link 117. Transmission begins with a low-going start pulse 205 asserted for a time $t_b$ representing the time used to transmit a single bit. The start bit 205 signals the second UART 120 that a stream of data will follow. For example, the stream of data 210 may include seven or eight data bits transmitted serially which represent the ASCII character A as described above. The first UART 115 may transmit a parity bit 215 which indicates the parity associated with the data 210. The first UART 115 transmits a series of stop bits 220 which indicate that the transmission of data 210 and parity 215 is complete. The first UART 115 may start a new transmission by transmitting another start bit 225.

The autobaud command may be executed according to the prior art by measuring the duration of the start bit and generating a corresponding clock frequency representing the estimated baud rate of the asynchronous serial data stream. If the clock frequency is correct the second UART 120 may receive two successive characters representing an autobaud command. If the clock frequency is incorrect, the data 210 will not be sampled according to the asynchronous serial data format described above and will not be equal to the data transmitted by the first UART 115. For example, if first UART 115 transmits ASCII characters AT in succession at about 56.6 kbits/sec, the duration of the start bit ($t_b$) will be about 17 us. Therefore, a clock frequency of about 56.6 kHz may be used as the clock frequency to clock data 210 into the second UART 120. If the two characters received by the second UART 120 are equal to AT, the estimated baud rate is correct. If however, the two ASCII characters clocked into the second UART 120 are not equal to AT, the estimated baud rate is incorrect or first UART 115 did not transmit an autobaud command.

Asynchronous serial data communications systems according to the prior art may operate at high speed (e.g., 115,200 bps). At 115,200 bps, the start bit duration ($t_b$) is about 8.5 microseconds. Consequently, the second UART 120 may be required to measure a $t_b$ of about 8.5 microseconds to perform the autobaud function. The start bit duration may be measured using either hardware of software. The software approach may include a software loop which is well known in the art. The hardware approach may use a timer to time the duration of the start bit 205. The timer interrupts the processor 122, which reads the timer count, computes the data rate implied by the timer value, and sets up the second UART 120 with the computed baud rate. As explained below, the processor 122 may take about 1 millisecond to service the interrupt.

Wireless modems may have difficulty in measuring the duration of $t_b$ when baud rates approach 115,200 bps. Specifically, wireless modems may operate in an online command mode during which the modem may be busy at any time. In other words, a wireless modem may be performing other functions when an autobaud command is received. For example, wireless mobile devices used for connection-oriented services such as AMPS may be required to listen to a base station or transmit a message even when no connection is established. Consequently, the modem in a wireless device may be too busy to perform the autobaud function using either the software loop or the hardware timer approach. For example, it may take one millisecond for the wireless modem to respond to an interrupt from the UART. At 8.5 microseconds per bit, one millisecond is the duration of roughly twelve characters. Therefore, an entire autobaud command may be sent by DTE 100 before DCE 101, using a hardware timer, could process the transmitted characters.

SUMMARY OF THE INVENTION

It is, therefore, an object of the present invention to provide improved autobaud detection.

It is another object of the present invention to allow reduction of the latency associated with processing the autobaud command.

It is another object of the present invention to allow an increase in the efficiency in processing the autobaud command.

These and other objects are provided by determining a duration of a data bit within an asynchronous data stream and generating a clock frequency corresponding to the duration of the data bit. The data bits from the asynchronous data stream are clocked into a register using the generated clock frequency to form a register value. The asynchronous data stream is processed according to at least one of the duration of the data bit and the register value. If an error is detected, clocking the data bits from the asynchronous data stream into the register is terminated. If no error is indicated, the baud rate of the UART is set to the generated frequency. Errors may be indicated as a result of a comparison of the start bit duration to subsequent data bits or a comparison of the register value to a predetermined value.

The duration of a start bit may be measured and compared to the duration of other bits in the asynchronous data stream. Clocking is terminated if the duration of the other bits is substantially less than the duration of the start bit. Alternatively, the comparison may be performed on each data bit within the asynchronous data stream or only on the start bit.

The present invention may reduce the latency associated with processing the autobaud command. In particular, an asynchronous serial system according to the present invention can reduce the latency by clocking the data bits from the asynchronous data stream into the register using the generated clock frequency. The clocked data is compared to a predetermined value which may equal a character used to represent the autobaud command. Thereby, the present invention can determine whether the data received is an autobaud command without interrupting the processor. Systems according to the prior art, may use a software loop or a hardware timer with an interrupt to perform the autobaud command. The latency associated with these approaches may not allow enough time to process the characters which make up the autobaud command. In particular, if the autobaud command were transmitted at 115,200 baud while the DCE was busy, the DCE interrupt latency may cause the processor within the DCE to miss the autobaud characters transmitted by the DTE. For example, wireless modems may be required to communicate with a base station at any time and therefore may be performing other functions when an autobaud command is serviced.

The present invention may also reduce latency when the UART is transmitting data while an autobaud command is received. According to the present invention, the autobaud command is processed by the autobaud circuit. Therefore, the DCE may examine the autobaud circuit after the UART finishes transmitting the data. According to the prior art, the UART completes the transmission of data before an autobaud command may be processed. Consequently, an autobaud command and associated data may not be received because the UART is currently busy transmitting data.

The present invention may also increase the efficiency of processing the autobaud command processing. In particular, the register value may be compared to a predetermined value which may equal a character used to represent the autobaud command. Clocking is terminated if the predetermined value does not equal the register value and the processor is not interrupted. Thus the present invention may reduce the number of erroneous interrupts to the processor. Existing DTEs may transmit spurious characters prior to transmitting the autobaud command, causing erroneous interrupts in the prior art. Similarly, personal computers may produce transient signals on an a serial interface which may also cause erroneous interrupts in prior art systems. The present invention may reduce erroneous interrupts by examining the spurious characters or transient signals before interrupting the processor.

In particular, the comparison is made before the register holds a complete character. The clocking may be terminated if the data bits in the register do not equal the corresponding portion of the predetermined value. For example, if the register contains bit 1=1, bit 2=0, and bit 3=0, but has yet to receive bits 4 through 7, the character being received may be the first character of the autobaud command AT, wherein the character A is represented by bit 1=1, bit 2=0, bit 3=0, bit 4=0, bit 5=0, bit 6=0, and bit 7=1. Alternatively, if the register held bit 1=0, the character being received may not be the character A. Accordingly, no additional bits would be clocked into the register.

BRIEF DESCRIPTION OF THE DRAWINGS

FIG. 1 is a block diagram of an asynchronous serial communications system according to the prior art;

FIG. 2A is a table of bit value combinations used to represent ASCII characters according to the prior art;

FIG. 5B, 5C, 5D, and 5E are tables which illustrate bit combinations which may be used to encode character formats;

FIGS. 7, 8, 9, 10, and 11 illustrate exemplary operations of another embodiment of the present invention.

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiments set forth herein; rather these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, data processing system or program product. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the medium. Any suitable computer readable medium may be utilized including hard disks, CD-ROMs, optical storage devices, or magnetic storage devices.

The present invention is also described using flowcharts. Those skilled in the art will understand that each block of the flowchart illustrations, and combinations of blocks in the flowchart illustrations, may be implemented with various commonly used communication system components. It will also be understood that portions of the operations described in the flowchart illustrations may be executed as computer program instructions loaded into a computer or other data processing apparatus, thus producing a machine which provides means for implementing the functions specified in the flowchart blocks and combinations thereof. The computer program may cause operational steps to be performed on the computer or data processing apparatus to produce a computer-implemented process such that the instructions which execute on the computer or data processing apparatus provide steps for implementing the functions of the flowchart blocks or combinations thereof. Accordingly, blocks of the flowchart illustrations support combinations of means for performing the specified functions and combinations of steps for performing the specified functions.

Figure 2B:
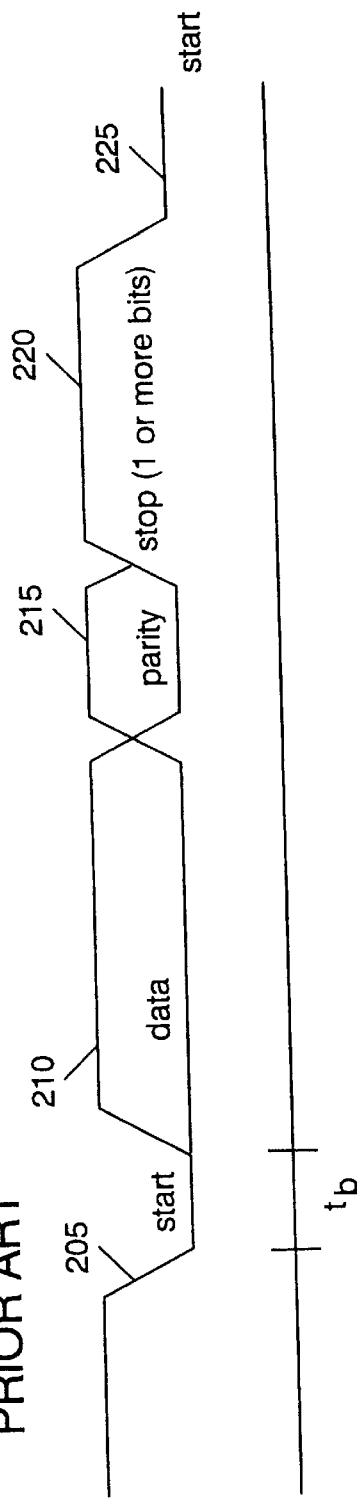
FIG. 2B is a timing diagram illustrating an asynchronous serial communications format according to the prior art.
Figure 3:
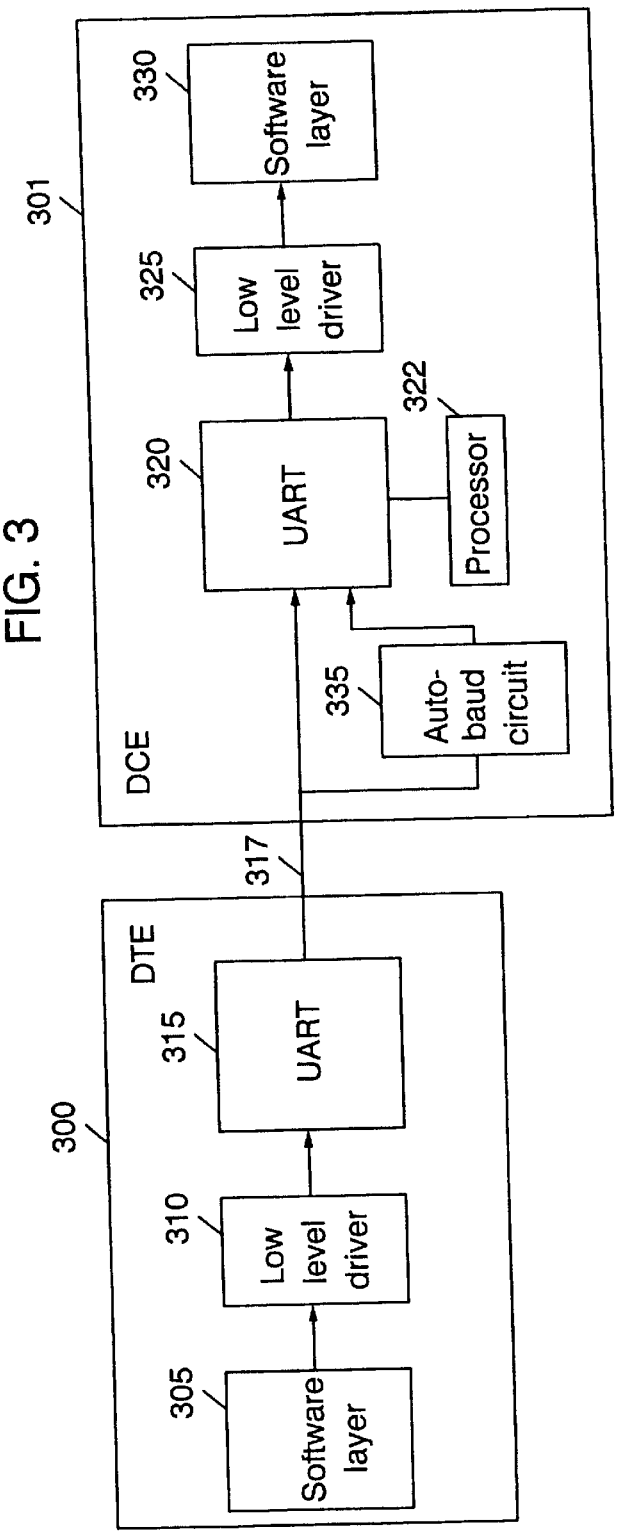
FIG. 3 is a block diagram of asynchronous serial communications systems and methods according to the present invention.

FIG. 3 is a block diagram of an asynchronous serial communications system according to the present invention. DTE 300 is a data terminal equipment, such as an ASCII terminal or a personal computer. DCE 301 may be a data communications equipment, such as a modem. Communications link 317 may be an asynchronous serial data communication link between DTE 300 and DCE 301. DTE 300 may include a first upper software layer 305, a second low level driver 310 and a first UART 315. The first upper software layer 305 may carry out high level functions required of DTE 300. For example, first upper software layer 305 may be a software application. First low level driver 310 may be a low level software module used to carry out system functions required by the first upper software layer 305. The first low level driver 310 may have detailed information regarding the operation of the hardware included in DTE 300, such as the first UART 315. The first UART 315 may carry out asynchronous serial data communications over the communications link 317.

The DCE 301 may include the second UART 320, a low level driver 325, an upper software layer 330 (all of which may be analogous to the components included in DTE 300), a processor 322, and an autobaud circuit 335 for processing autobaud commands transmitted by first first UART 315. The autobaud circuit 335 may then notify the second UART 320 of the current baud rate, so that the second UART 320 may receive character information across communications link 317.

Figure 4:
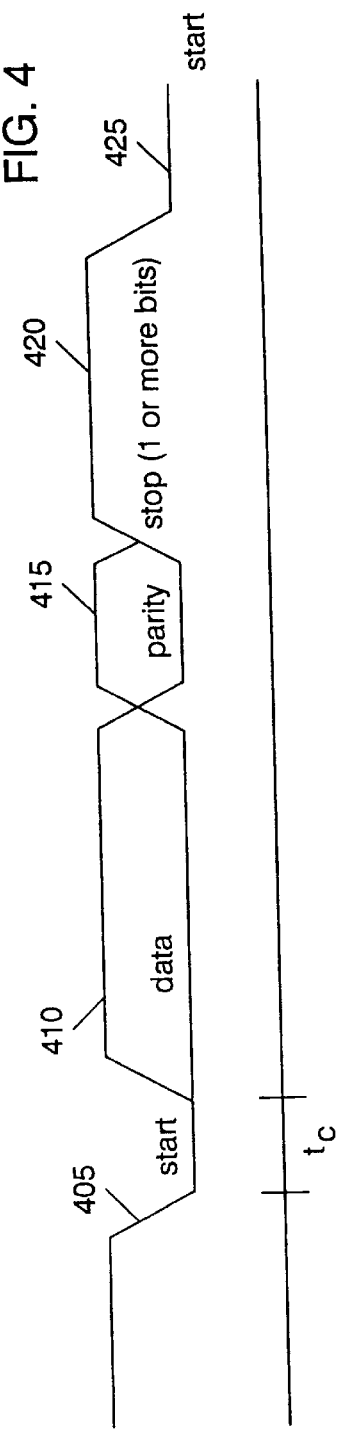
FIG. 4 is a timing diagram illustrating an asynchronous serial communications format according to the present invention.

FIG. 4 illustrates the logic levels of various signals within an asynchronous serial data communications format used by communications link 317. The communications link 317 uses an asynchronous serial data communications format such as ITU V.24 or V.28, to carry the asynchronous data stream. Transmission begins with a low-going start pulse 405 asserted for a time $t_c$ representing the time used to transmit a single bit which signals the second UART 320 that a stream of data will follow. For example, the start bit 405 may signal that a data stream follows which may include seven or eight data bits, a parity bit 415 indicating the parity associated with the data 410, and one or two stop bits 420 which indicate that the transmission of data 410 and parity 415 is complete. The first UART 315 starts a new transmission by transmitting another start bit 425. The data may be transmitted according to a character format which indicates the significance of the bits transmitted. For example, data 420 may include data bits one through nine; wherein data bits one through seven represent character data and data bits eight and nine may be a parity bit or one or two stop bits, depending of the character format used.

First UART 315 and second UART 320 may operate at different speeds. For example first UART 115 may initially operate at 28.8k bps, while second UART 320 may initially operate at 33.3k bps. In this initial state, first UART 315 and second UART 320 may not be able to communicate. The autobaud command can be used to equalize the speed of first UART 315 and 320. The DTE 300 performs an autobaud command by transmitting a pair of known characters to the DCE 301. The DCE 301 measures the duration of the data bits which make up the known characters and initializes the second UART 320 to that baud rate. Once the second UART 320 is initialized to the same baud rate used by the first UART 315, first UART 315 and second UART 320 may communicate across the communications link 317. For example, the autobaud command may be implemented using the ASCII characters AT, at, a/, or A/ wherein each ASCII character is made up of a series of data bits as described above.

The autobaud circuit 335 determines the duration of the start bit 405 and generates a corresponding clock frequency by which serial data 410 is clocked into a register. The asynchronous data stream is then processed according to an error indication. The error indication may be provided by comparing the duration of each subsequent data bit within the data 410 to the start bit duration. If the difference between the duration of the data bits and the duration of the start bit 405 exceeds a predetermined threshold, an error is indicated. In a preferred embodiment, the predetermined threshold may be 25% of the duration of the start bit 405. For example, if the start bit duration were 17 microseconds and the duration of a subsequent data bit were 8.5 microseconds, the difference would be equal to 8.5 microseconds which represents 50% of the duration of the start bit. If no error is indicated, the baud rate of second UART 320 is set to the corresponding frequency and second UART 320 receives the asynchronous data stream.

In another embodiment, the autobaud circuit 335 may also compare the duration of the one or more stop bits 420 to the duration of the start bit 405. If the difference between the duration of the start bit 405 and the stop bits 420 exceeds the predetermined threshold, the autobaud circuit 335 would detect an error.

The error indication may also be provided by comparing the characters transmitted by the DTE 300 to predetermined values which represent the autobaud command. As the data bits within data 410 are clocked into the register, each bit is compared to the predetermined value. Thus, the autobaud circuit 335 may determine that the data bits received do not represent an autobaud command before all of the data included in the autobaud command is received. For example, if the autobaud circuit 335 receives a 1 as b2 over communications link 317, the autobaud circuit 335 would determine that the corresponding character could not comprise an ASCII character A or a, and therefore cannot be an autobaud command. Consequently, the autobaud circuit 335 indicates an error.

Figure 5A:
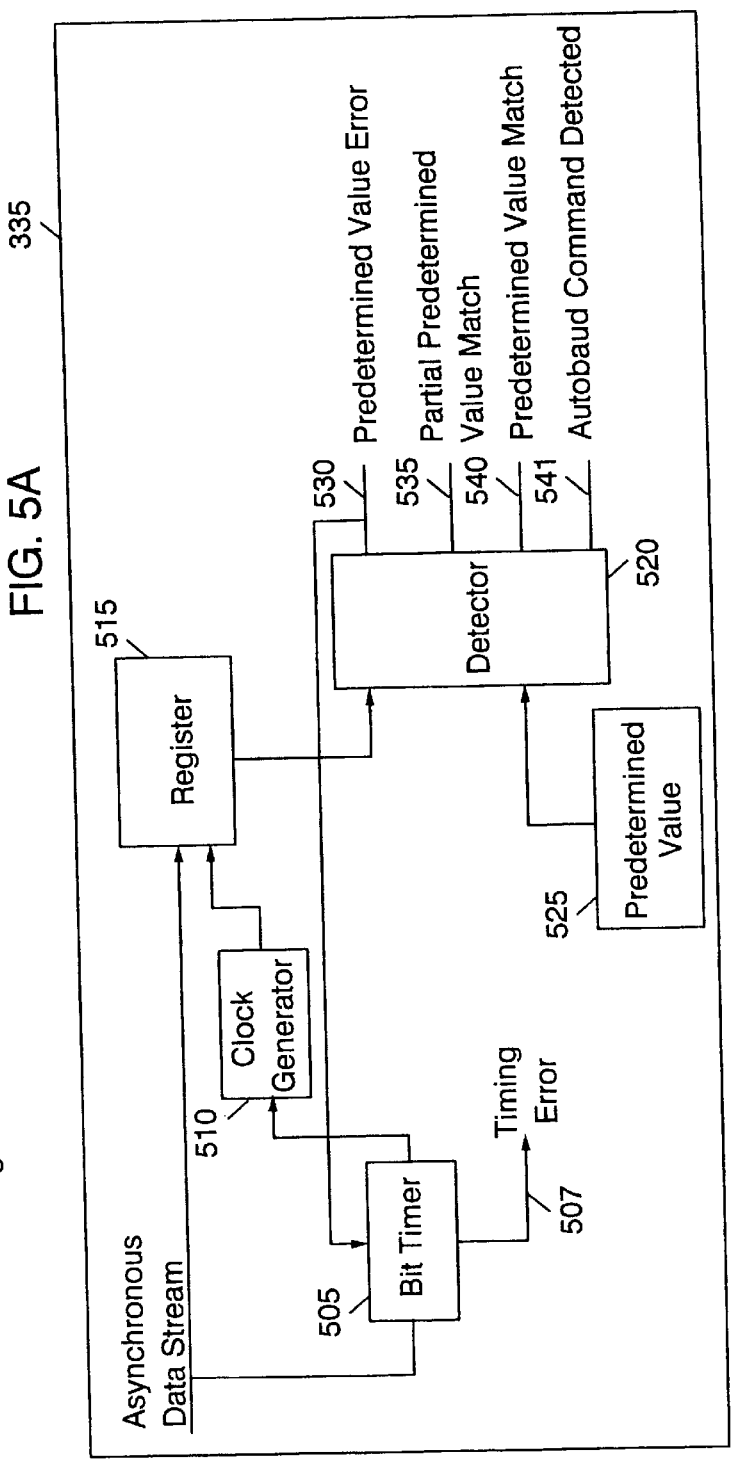
FIG. 5A is a block diagram of an autobaud circuit according to the present invention.

Referring now to FIG. 5A, the autobaud circuit 335 will now be described in greater detail. The asynchronous data stream is monitored by the bit timer 505. The bit timer 505 determines the duration of the start bit 405 and compares the start bit 405 duration with subsequent data bits within in the data 410. For example, the duration of start bit 405 is compared with the bits which make-up the data 410. The bit timer 505 generates a clock frequency or baud rate which corresponds to the duration of the start bit 405. The corresponding clock frequency is loaded into the clock generator 510 which supplies the corresponding clock frequency to the register 515. The data 410 is clocked into the register 515 at the corresponding frequency generated by the clock generator 510. Consequently, characters from the asynchronous data stream are shifted into the register 515.

The bit timer 505 also determines the duration of subsequent bits within the data 410. If the bit timer 505 determines that the duration of subsequent data bits 410 is substantially shorter than the duration of the start bit 405, an error 507 is indicated and the autobaud circuit is reset.

The detector 520 compares the contents of the register 515 to the appropriate predetermined value 525. The particular predetermined value may depend on which portion of the autobaud command has been received. Initially all ASCII characters which represent the first character of the autobaud command are appropriate predetermined values. For example, the ASCII characters A, a, T, t and/may initially be appropriate predetermined values. After the first character of the autobaud command has been received, however, the appropriate predetermined value changes. For example, after initially receiving an ASCII character A, ASCII characters T and/are appropriate predetermined values.

If the comparison indicates a difference between the register 515 and the predetermined value 525, the detector indicates a predetermined value error 530 which resets the autobaud circuit 335. If the detector 520 determines that the content of the register 515 partially matches the appropriate predetermined value 525, the detector 520 indicates a partial predetermined value match 535 which enables further clocking of data 410 into the register 515. For example, if the register 515 contains the bit values of b1=1, b2=0, and b3=0 as part of an ASCII character A, the detector 520 will determine that this value partially matches the predetermined value of an ASCII character A.

If the detector 520 determines that the register 515 and the predetermined value 525 match exactly, a predetermined value match 540 is indicated which enables another sequence of data 410 to be clocked into the register 515. For example, if the register 515 contains the bits b1=1, b2=0, b3=0, b4=0, b5=0, b6=0, and b7=1 the detector 520 indicates that the register 515 matches the predetermined value of the ASCII character A.

If the detector 520 determines that all of the characters which make-up the autobaud command have been received in succession, the autobaud command detected 541 is generated. Autobaud command detected 541 indicates that the second UART 320 may receive data from the asynchronous data stream at the baud rate which corresponds to the generated clock frequency described above.

The second UART 320 may also transmit an asynchronous data stream to the first UART 315. The data transmitted by the second UART 320 should be in the same format as that used by first UART 315. For example, characters transmitted across the communication link 317 may be formatted using a number of data bits, a type of parity and a number of stop bits. Ten-bit format may include seven data bits, a parity bit and two stop bits. Eleven-bit format may include eight data bits, a parity bit and two stop bits. The autobaud circuit 335 determines the format being used by the first UART 315 by examining data bits 8 and 9 within data 410. Second UART 320 will use the same format for data transmission to first UART 315. FIGS. 5B, 5C, 5D and 5E indicate the varying arrangements, well known in the art, which may be used to decode the character format in use. For example, if the autobaud command were comprised of the ASCII characters AT, FIG. 5B indicates that if bits 8 and 9 accompanying the ASCII character A were equal to 0 and 1 respectively and bits 8 and 9 accompanying the ASCII character T were equal to 1 and 1 respectively, the format in use would be seven data bits, even parity and one stop bit.

In an alternative embodiment, the present invention may be utilized to provide software flow control. Software flow control refers to the transmission of data using special characters to signal the start and stop of transmission. In particular, software flow control may use an XON and XOFF character to signal the start and stop of transmission respectively. For example, the first UART 315 would transmit an XON character to signal the start of a transmission and an XOFF character to signal the end of a transmission. Similarly, the second UART 320 would transmit XON and XOFF characters to signal the start and end of a transmission respectively. According to the prior art, each UART may examine the value of each of the incoming characters to determine whether it is an XON or XOFF character.

According to the present invention, software flow control may be accomplished by using the XON and XOFF characters as predetermined values 525. The XON and XOFF characters transmitted by first UART 315 would be clocked into the register 515 via the asynchronous data stream 317. The detector 520 would then compare the register 515 to the predetermined value 525. The detector 520 would then signal the processor that an XON or XOFF character has been detected. The bit timer 505, however, would be disabled so that the autobaud circuit 335 could not modify the baud rate for the second UART 320.

Figure 6A:
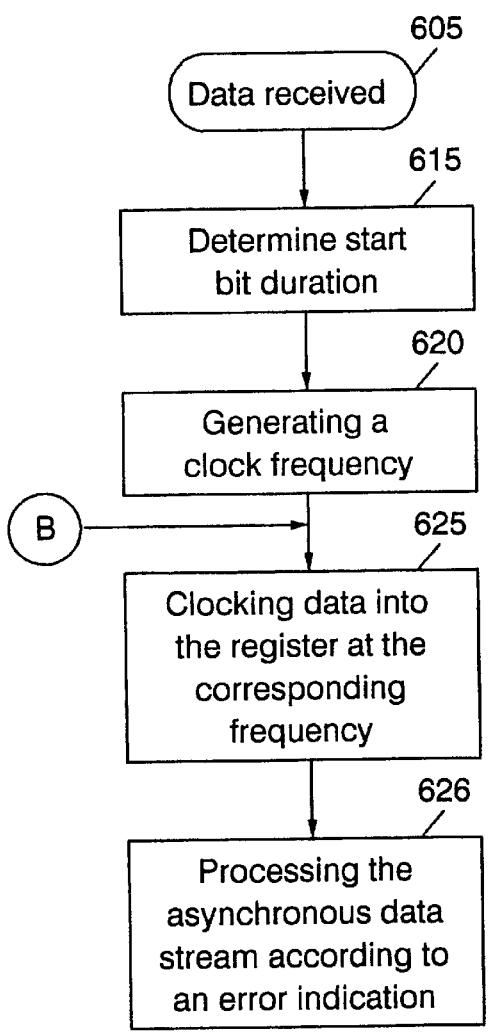
FIG. 6A and 6B are flowcharts illustrating operations of an autobaud circuit according to the present invention.
Figure 6B:
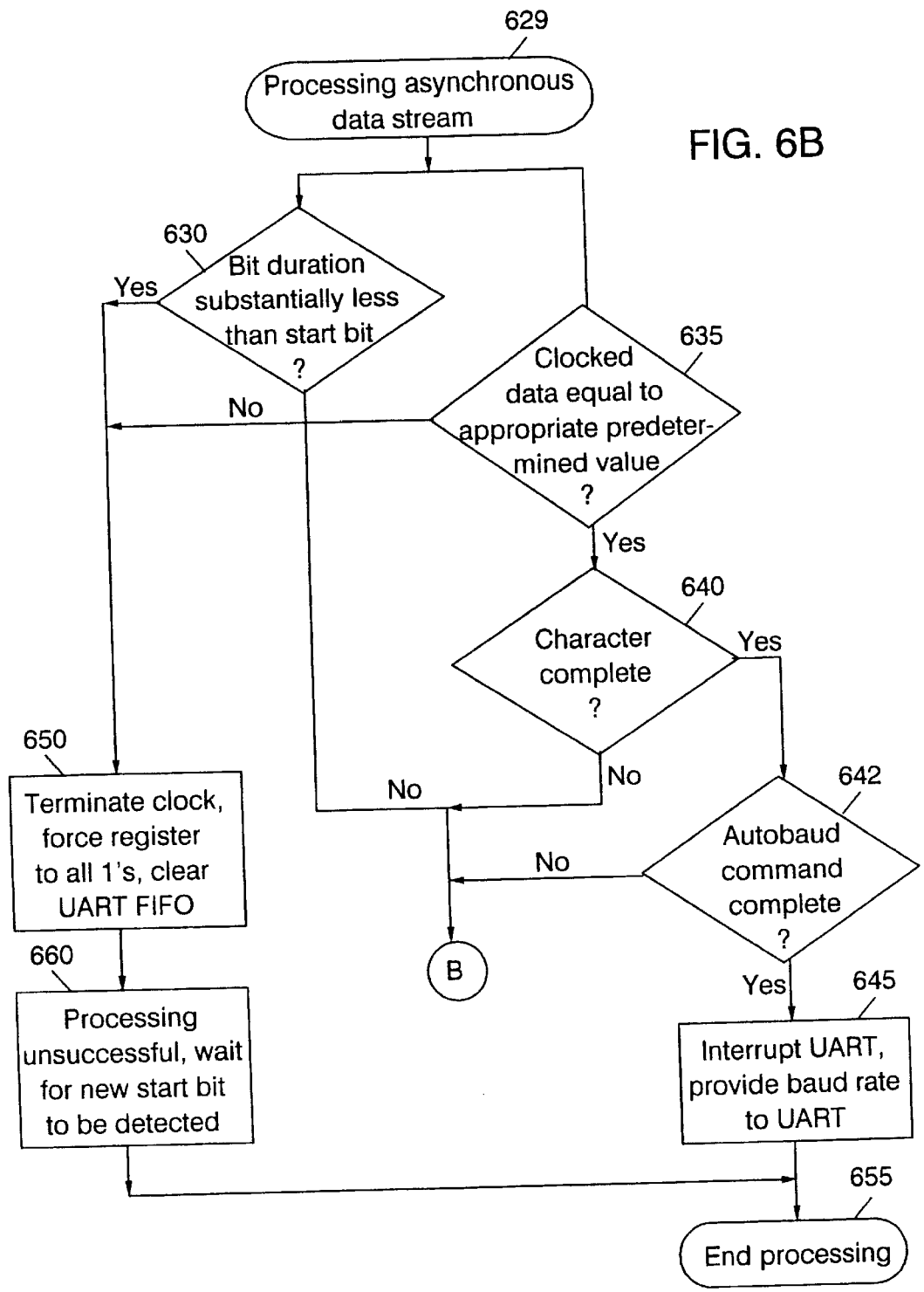

FIGS. 6A and 6B are flowcharts illustrating operations of an autobaud circuit according to the present invention.

Referring now to FIG. 6A, when data is received (Block 605), the bit timer determines the duration of the start bit (block 615). A corresponding clock frequency is generated (Block 620) and the clock is programmed with the corresponding clock frequency. Data from the asynchronous data stream is clocked into the register at the corresponding frequency (Block 625). The asynchronous data stream is processed according to an error indication. The error indication is provided by comparing the duration of the start bit to the duration of subsequent data bits. If the duration of the subsequent data bits is substantially less than the duration of the start bit, an error is indicated and the clocking of data from the asynchronous data stream into the register is terminated. If no error is indicated, the UART is left configured with the baud rate corresponding to the generated clock. An error indication may also be provided by comparing the register value to a predetermined value which represents a character used to make-up the auto baud command. If the register value does not completely match the appropriate predetermined value, an error is indicated and the clocking of data from the asynchronous data stream into the register is terminated. If no error is indicated, the UART is configured with the baud rate corresponding to the generated clock.

Referring now to FIG. 6B, the processing of the asynchronous data stream is described in greater detail (Block 629). The duration of subsequent bits within the asynchronous data stream are compared to the duration of the start bit (Block 630). If the duration of any subsequent data bits is substantially less than the start bit, the detector indicates an error in the baud rate, terminates clocking, forces all cells in the register to one, the clears the UART FIFO (Block 650). Processing then waits for a new start bit to be detected (Block 660). Referring back to Block 630, if the duration of all subsequent data bits is not substantially less than the duration of the start bit, clocking continues (Block 625).

The autobaud circuit also compares the value of the data received via the asynchronous data stream to a set of predetermined values. The received data is clocked into the register and compared to the appropriate predetermined value (Block 635). If the clocked data is not equal to the appropriate predetermined value, an error is indicated and the clocking is terminated, all of the cells in the register are forced to ones, and the UART FIFO is cleared (Block 650). Processing then waits for a new start bit be detected (Block 660). If, however, the clock data is determined to be equal to at least a portion of the predetermined value (Block 635), a determination is made as to whether the complete character has been received via the asynchronous data stream (Block 640). If a complete character has not been received (Block 640), additional data is clocked into the register at the corresponding frequency (Block 625). If a complete character has been received (Block 640) the autobaud circuit determines whether a complete autobaud command has been received (block 642). If a complete autobaud command has been received, an interrupt is sent to the UART and clocking of the register is terminated (Block 645). If, however, a complete autobaud command has not been received, additional data is clocked into the register at the corresponding frequency (Block 625).

Figure 7:
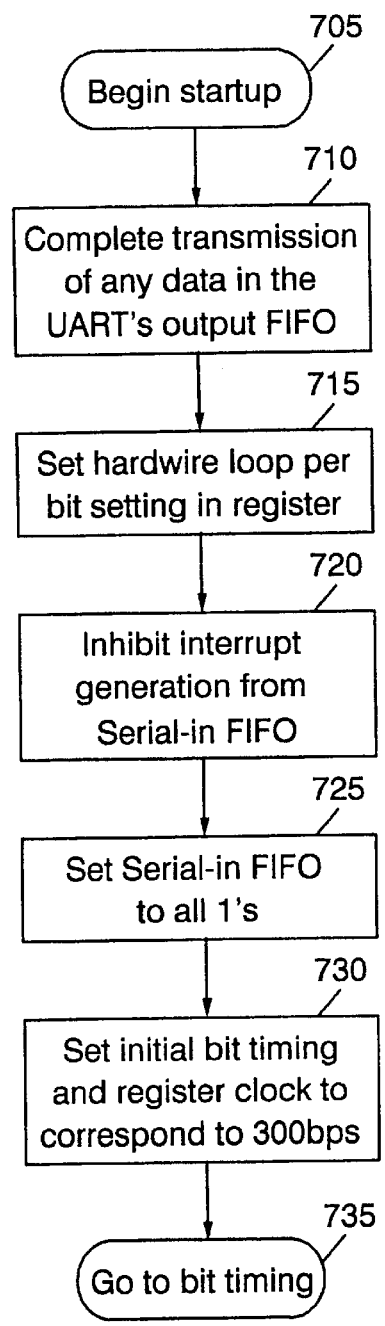

FIGS. 7, 8, 9, 10, and 11 illustrate exemplary operations of another embodiment of the present invention which, in conjunction with the description herein, enable one skilled in the art to practice the present invention. FIG. 7 illustrates a particular initialization of the second UART 320, the autobaud circuit 335 and the processor 322 according to the present invention (Block 705). Any data present in the output FIFO of the UART is transmitted (Block 710). The hardwire loop-per-bit is set in the register (Block 715). The Serial-in FIFO interrupt is inhibited (Block 720). The contents of the Serial-in FIFO are set to all ones (Block 725). The initial bit timing and register clock are set to 300 bps (Block 730). The bit timing of the asynchronous data stream is then checked (Block 735).

Figure 8:
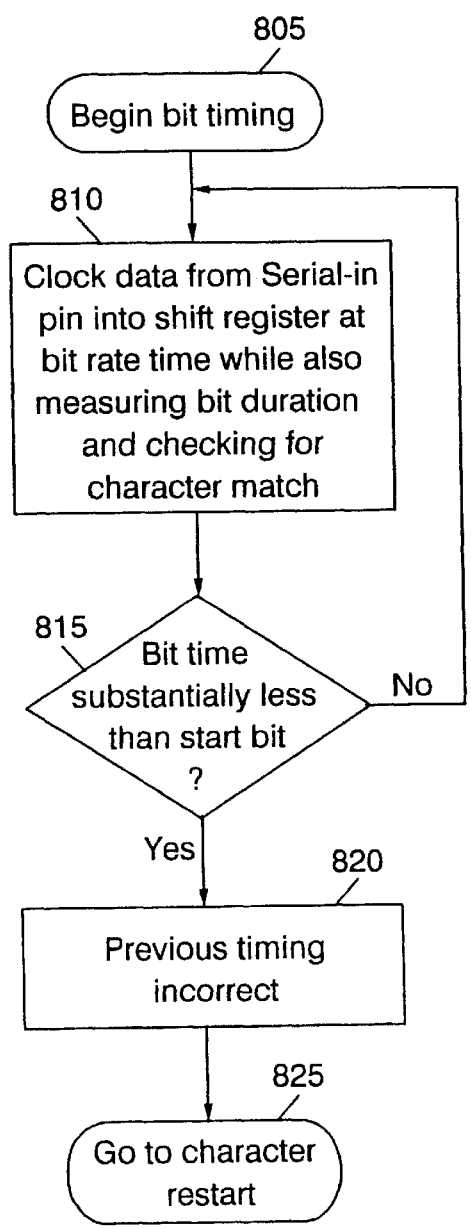

FIG. 8 illustrates a particular bit timing operation according to the present invention (Block 805). Data is clocked into the shift register from the Serial-in pin (Block 810). The bit duration of the of the data is measured. The character value is checked substantially simultaneously with the duration of the data bit. If the data bit duration is substantially less than the duration of the start bit (Block 815), the previous bit timing is determined to be incorrect (Block 820) and a character re-start is initiated (Block 825). If, however, the data bit duration is not substantially less than the duration of the start bit (Block 815), more data is clocked in (Block 810).

Figure 9B:
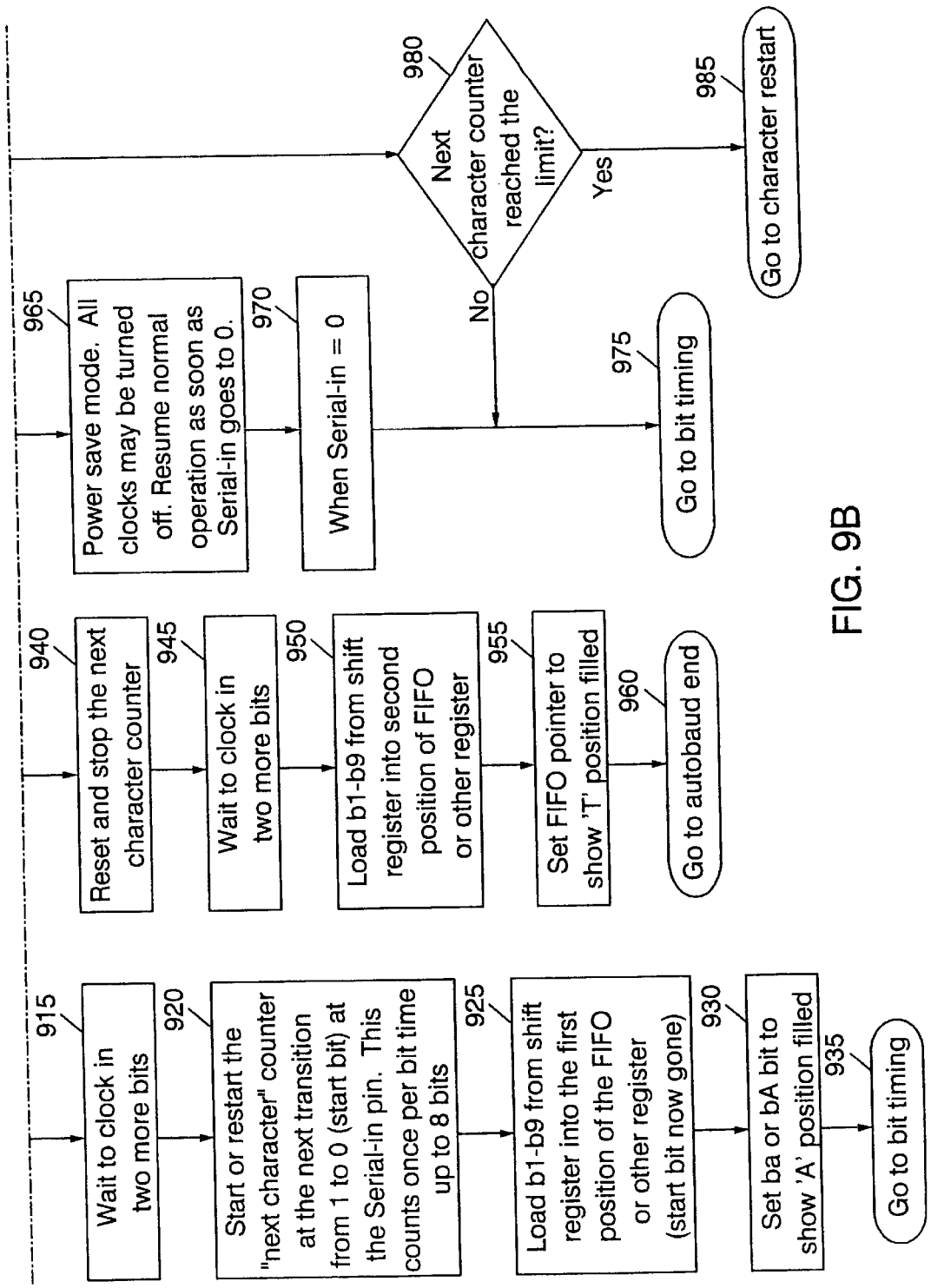

FIG. 9 illustrates a particular character matching according to the present invention (Block 905). The register value is compared to the predetermined values: a, A, t, T,/(Block 910). Each predetermined value is associated with a particular output. Output 1 is associated with the characters a and A. If the register value equals either the predetermined value a or A, two bits are clocked in (Block 915). The next-character counter is re-started at the next 1 to 0 transition at the Serial-in pin (Block 920). B1 through b9 are loaded from the shift register into the first position in the FIFO (Block 925). The ba or BA bit is set to indicate that the corresponding character has been received (Block 930). The duration of the next data bit is then measured (Block 935).

Output 2 is associated with the characters /, t, and T (Block 910). If the register value equals either the predetermined value t, T or /, the next character counter is reset (Block 940) and two bits are clocked in (Block 945). B1 through b9 are loaded from the shift register into the second position in the FIFO (Block 950). The FIFO pointer is then set to indicate that the corresponding character has been received (Block 955). The Autobaud is then concluded (Block 960).

Output 3 is associated with receiving no characters (Block 910). Power save mode is initiated wherein the high speed clock and the register clock may be terminated (normal operations may be resumed when 1 to 0 transition is detected on the Serial-in pin) (Block 965). When a 1 to 0 transition is detected (Block 970), the bit timing is measured (Block 975).

Output 4 is associated with receiving characters which do not match characters which represent the autobaud command (Block 910). If the next character counter has not reached the limit (Block 980), the bit timing of the next data bit is monitored (Block 975). If the next character counter has reached the limit (Block 980), a character re-start is initiated (Block 985).

Figure 10:
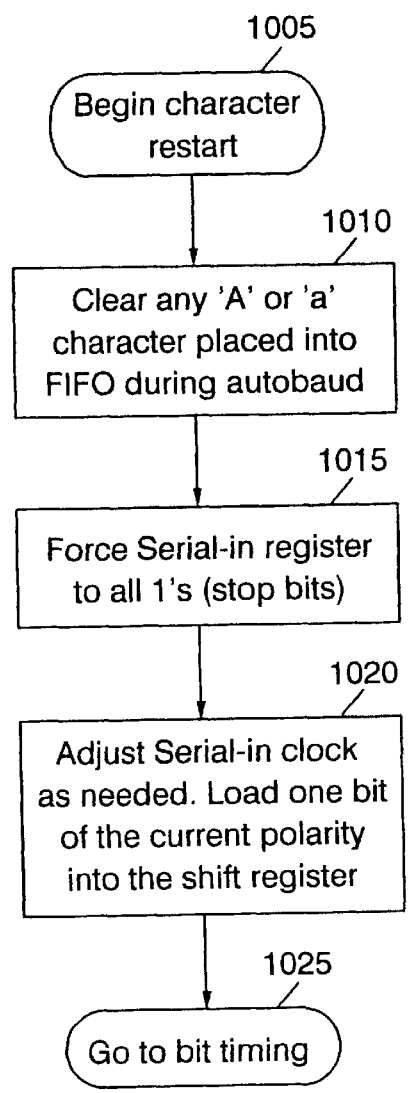

FIG. 10 illustrates a character re-start according to the present invention (Block 1005). Any character A or a placed into the FIFO during autobaud is cleared (Block 1010). The contents of the Serial-in register are forced to all ones (Block 1015). The Serial-in clock is adjusted as needed and one bit of the current polarity is loaded into the shift register (Block 1020). The duration of the next data bit is then measured (Block 1025).

FIG. 11 illustrates setting the generated baud rate according to the present invention (Block 1105). The processor is interrupted by the autobaud process (Block 1110).

Alternatively, the processor may initiate a shutdown (Block 1115). The hardwire loop is disabled at a time when the Serial-in data is a one (a stop bit) by writing a 0 to the hardwire loop bit (Block 1120). The clocks are then turned off and the Serial-in and clocking are set-up for the correct speed (Block 1125). The autobaud enable is set to 0 so as to clear the interrupt (Block 1130).

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A circuit for detecting the timing of a plurality of data bits within an asynchronous data stream comprising:
    a bit timer that measures a duration of a start bit associated with the asynchronous data stream and a duration of a data bit within the asynchronous data stream;
    a register;
    a clock generator, responsive to the bit timer, that clocks data bits from the asynchronous data stream into the register; and
    a detector, responsive to the bit timer, that detects a difference in the duration of the start bit and the duration of the data bit.

2. The circuit of claim 1, wherein said register comprises a shift register that provides access to the clocked data bits in parallel.

3. The circuit of claim 1, wherein said detector comprises a comparator that compares the clocked data bits held in the register to a predetermined value.

4. The circuit of claim 1, wherein said predetermined value comprises at least one of the following characters: A, a, T, t, /.

5. The circuit of claim 1, wherein said detector comprises:
    a comparator that compares the duration of a start bit to the duration of data bits within the asynchronous data stream; and
    a detector that indicates an error if the duration of the start bit is substantially different than the duration of data bits within the asynchronous data stream.

6. A method for processing an asynchronous data stream comprising the steps of:
    determining a duration of a start bit associated with the asynchronous data stream;
    determining a duration of a data bit within the asynchronous data stream; and processing the asynchronous data stream based on a difference between the duration of the start bit and the duration of the data bit.

7. The method of claim 6, wherein said step of processing comprises the step of terminating clocking the data bits from the asynchronous data stream into the register when an error is indicated.

8. The method of claim 6, wherein said step of processing comprises the step of receiving the asynchronous data stream at the generated clock frequency.

9. The method of claim 7, wherein said step of terminating clocking the data bits from the asynchronous data stream into the register when an error is detected comprises the steps of:
    comparing the duration of a start bit to the duration of a subsequent data bit; and
    terminating clocking the data bits from the asynchronous data stream into the register if the duration of the subsequent data bit is less than the duration of the start bit.

10. The method of claim 7, wherein said step of terminating comprises the steps of:
    comparing the register value to a predetermined value; and
    terminating clocking the data bits from the asynchronous data stream into the register if the register value is not equal to the predetermined value.

11. The method of claim 10, wherein said step of comparing the register value to a predetermined value comprises the step of comparing the register value to a predetermined value, wherein the comparison occurs when the data bit is clocked into the register.

12. The method of claim 10, wherein said step of comparing the register value to a predetermined value comprises the step of comparing the register value to a predetermined value, wherein the predetermined value is at least one of the following characters: A, T, a, t,/.

13. The method of claim 6, wherein said step of determining a duration of a start bit within a asynchronous data stream is preceded by the steps of:
    transmitting a command string from a personal computer; and
    receiving the command string with a modem.

14. A system for detecting the speed of an asynchronous data stream comprising:
    means for determining a duration of a start bit associated with the asynchronous data stream;
    means for determining a duration of a data bit within the asynchronous data stream; and
    means for detecting an error associated with the asynchronous data stream based on a difference between the duration of the start bit and the duration of the data bit.

15. The system according to claim 14, wherein said means for generating a data bit time based upon a start bit duration comprises:
    means for determining the duration of the start bit; and
    means, responsive to said means for determining the duration of the start bit, for determining a clock frequency for clocking data bits within the asynchronous data stream into a register.

16. The system according to claim 14, wherein said means for detecting an error in the asynchronous data stream based on the data that follows the start bit comprises:
    means for determining the duration of a data bit that follows the start bit;
    means for comparing the start bit duration to the duration of a data bit that follows the start bit; and
    means, responsive to said means for comparing, for indicating an error if the start bit duration is different than the duration of the data bit that follows the start bit.

17. The system according to claim 14, wherein said means for detecting an error in the asynchronous data stream based on the data that follows the start bit comprises means for comparing the data that follows the start bit to predetermined values.

18. The system according to claim 17, wherein said means for comparing the data that follows the start bit to predetermined values comprises means for comparing the data that follows the start bit to a portion of the predetermined values.

* * * * *